(12) United States Patent
Klotz et al.

(10) Patent No.: US 11,313,957 B2
(45) Date of Patent: Apr. 26, 2022

(54) METHOD AND DEVICE FOR MONITORING THE FUNCTION OF ULTRASONIC SENSORS

(71) Applicant: Robert Bosch GmbH, Stuttgart (DE)

(72) Inventors: Albrecht Klotz, Leonberg (DE); Andras Roka, Budapest (HU); Michael Schumann, Stuttgart (DE); Nandor Podmaniczky, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/967,194

(22) PCT Filed: Apr. 4, 2019

(86) PCT No.: PCT/EP2019/058498
§ 371 (c)(1),
(2) Date: Aug. 4, 2020

(87) PCT Pub. No.: WO2019/193092
PCT Pub. Date: Oct. 10, 2019

(65) Prior Publication Data
US 2020/0371219 A1 Nov. 26, 2020

(30) Foreign Application Priority Data
Apr. 4, 2018 (DE) .......................... 102018205048.1

(51) Int. Cl.
*G01S 7/52* (2006.01)
*G01S 7/00* (2006.01)
*G01S 15/931* (2020.01)

(52) U.S. Cl.
CPC .......... *G01S 7/52004* (2013.01); *G01S 7/003* (2013.01); *G01S 15/931* (2013.01); *G01S 2007/52012* (2013.01)

(58) Field of Classification Search
CPC .... G01S 7/003; G01S 15/931; G01S 7/52004; G01S 2007/52012
See application file for complete search history.

(56) References Cited

U.S. PATENT DOCUMENTS

2014/0198620 A1* 7/2014 Prausse ................... G01S 7/521
 367/100
2016/0291153 A1* 10/2016 Mossau ..................... G01S 7/56
(Continued)

FOREIGN PATENT DOCUMENTS

CN 101545975 A 9/2009
DE 102005057973 A1 6/2007
(Continued)

OTHER PUBLICATIONS

International Search Report for PCT/EP2019/058498, dated Jul. 3, 2019.

*Primary Examiner* — Isam A Alsomiri
*Assistant Examiner* — Amie M Ndure
(74) *Attorney, Agent, or Firm* — Norton Rose Fulbright US LLP; Gerard Messina

(57) ABSTRACT

A method for monitoring the function of ultrasonic sensors of a vehicle, an ultrasonic sensor of the vehicle emitting ultrasonic signals and receiving back reflected ultrasonic echoes. An instantaneous amplitude of a ground echo received by an ultrasonic sensor and an instantaneous vehicle position are determined. A reference threshold value or information regarding an expected ground echo amplitude is retrieved from a digital map as a function of the instantaneous vehicle position, the digital map being provided by a central unit. The instantaneous amplitude of the received ground echo is compared with a threshold value, a malfunction of the ultrasonic sensors being deduced if the threshold value is undershot and the threshold value being predefined (Continued)

by the reference threshold value or the threshold value being determined based on the information regarding an expected ground echo amplitude.

9 Claims, 2 Drawing Sheets

(56) References Cited

U.S. PATENT DOCUMENTS

| | | | |
|---|---|---|---|
| 2017/0045611 A1* | 2/2017 | Gunzel | G01S 15/931 |
| 2018/0239017 A1* | 8/2018 | Milschewski | G01S 15/10 |
| 2020/0363501 A1* | 11/2020 | Lau | G01S 7/52004 |
| 2020/0371219 A1* | 11/2020 | Klotz | G01S 15/931 |

FOREIGN PATENT DOCUMENTS

| | | | |
|---|---|---|---|
| DE | 102007026688 A1 | 12/2008 | |
| DE | 102009032124 A1 | 1/2011 | |
| DE | 102011085287 A1 | 5/2013 | |
| DE | 102012216290 A1 * | 3/2014 | G01S 15/93 |
| DE | 102012216290 A1 | 3/2014 | |
| DE | 102013205312 A1 | 10/2014 | |
| DE | 102013015410 A1 | 3/2015 | |
| DE | 102014106011 A1 | 10/2015 | |
| WO | 2013072133 A1 | 5/2013 | |
| WO | WO-2013072133 A1 * | 5/2013 | G01S 15/89 |

* cited by examiner

METHOD AND DEVICE FOR MONITORING THE FUNCTION OF ULTRASONIC SENSORS

FIELD

The present invention relates to a method for monitoring the function of ultrasonic sensors of a vehicle, an ultrasonic sensor of the vehicle emitting ultrasonic signals and receiving back reflected ultrasonic echoes, and an amplitude of a received ground echo being determined and being compared with a threshold value. Further aspects of the present invention relate to a central unit, a device and computer programs, which are configured to be used with the described method.

BACKGROUND INFORMATION

Modern vehicles are increasingly equipped with driving assistance systems that are intended to support a driver when executing various driving maneuvers. In addition, developments are available with which vehicles are operated partially or fully autonomously, no interventions of a driver in the control of the vehicle being necessary. Such driving assistance systems include, for example, parking systems, which are able to independently identify parking spaces and to guide the vehicle into the parking space. To fulfill their tasks, the driver assistance systems require reliable sensors in order to obtain a preferably precise image of the surroundings of the vehicle. Ultrasonic sensors are frequently used for such purpose. In this case, a transmitter emits an ultrasonic signal, whose echo, when reflected at an obstacle, is registered by a receiver at the vehicle. Based on the time that has elapsed between the emission and the reception of the signal, and on the known sound velocity, it is possible to calculate the distance between the vehicle and the reflecting obstacle.

The function of such ultrasonic sensors may, however, be impaired, for example, as a result of aging or contamination. Thus, for example, contamination or also ice or snow may severely attenuate ultrasound, so that the function of the ultrasonic sensor is no longer provided or provided only to a very limited extent.

It is therefore necessary to be able to check the operability of an ultrasonic sensor during operation, a blockage of an ultrasonic sensor, in particular, needing to be identified.

A method for monitoring the function of ultrasonic sensors of a vehicle is described in German Patent Application No. DE 10 2012 216 290 A1. The vehicle includes at least one ultrasonic sensor, which is oriented in parallel to the movement direction and includes at least one ultrasonic sensor, which is oriented perpendicular to the movement direction. Ultrasonic signals are emitted via the ultrasonic sensors and ground echoes reflected by the ground are received during the drive. In the process, the ground echo, which is received with the at least one sensor oriented perpendicular to the movement direction, is recorded as a reference signal and is compared with the received ground echo of at least one sensor aligned in parallel. If deviations are identified during the comparison, a malfunction of the sensor is deduced. During the comparison, the Doppler shift is taken into account.

German Patent Application No. DE 10 2014 106 011 A1 describes a method for identifying a blocked state of an ultrasonic sensor. For this purpose, an actual value of at least one oscillation parameter is detected and compared with a limiting value for identifying a blocked state. In the process, a probability value, which indicates the instantaneous probability for the blocked state of the ultrasonic sensor, is determined as a function of a measured variable of a sensor differing from the ultrasonic sensor.

German Patent Application No. DE 10 2013 015 410 A1 describes a method for identifying a blocked state of an ultrasonic sensor device, in which an oscillation parameter of a sensor is evaluated. The oscillation parameter may be, in particular, a resonance frequency, which is a function of a mass of the diaphragm. Since the resonance frequency is also temperature-dependent, an instantaneous temperature is detected and a reference value is adjusted as a function of the temperature.

When monitoring the function of an ultrasonic sensor via the reception of ground echoes, the problem arises that the amplitude of the received ground echoes is a function of the nature of the ground. In addition to large-scale properties such as the roughness of the ground or the presence of gravel, the amplitude is also influenced by weather conditions such as water, ice, or snow on the ground.

SUMMARY

In accordance with an example embodiment of the present invention, an example method is provided for monitoring the function of ultrasonic sensors of a vehicle, an ultrasonic sensor of a vehicle emitting ultrasonic signals and receiving reflected ultrasonic echoes back. The example method includes the steps:

a) determining an instantaneous amplitude of a ground echo received by an ultrasonic sensor and determining an instantaneous vehicle position, b) retrieving a reference threshold value or information regarding an expected ground echo amplitude as a function of the instantaneous vehicle position from a digital map, the digital map being provided by a central unit, and c) comparing the instantaneous amplitude of the received ground echo with a threshold value, a malfunction of the ultrasonic sensor being deduced if the threshold value is undershot, and the threshold value being predefined by the reference threshold value or the threshold value being determined based on the information regarding the expected ground echo amplitude.

The method provided may be used for monitoring one or multiple ultrasonic sensors of a vehicle. When monitoring multiple ultrasonic sensors, the determination of the instantaneous amplitude of a ground echo received by the corresponding ultrasonic sensor and the step of comparing the instantaneous amplitude of the received ground echo are carried out with a threshold value for each of the ultrasonic sensors to be checked.

To determine an instantaneous amplitude of a received ground echo according to step a), the ultrasonic sensor of the vehicle to be checked emits an ultrasonic signal and reflected ultrasonic echoes are received back. Ground echoes may be identified in the received ultrasonic echoes, for example, in that the ground echoes are received after a signal propagation time, which corresponds to the path covered by the sound from the sensor to the ground and back, while taking the installation location and the orientation of the ultrasonic sensor into account. Alternatively or in addition, the amplitude profile of the measured signal of the ultrasonic sensor may be averaged over multiple measurements after the emission of the ultrasonic signal. Amplitude profiles characteristic for ground echoes may be subsequently identified in the averaged amplitude profile obtained.

The reference threshold value or the information regarding an expected ground echo amplitude is retrieved for the determined vehicle position from a digital map. The [determination] of the instantaneous vehicle position in this case may take place, for example, using satellite navigation such as, for example, GPS or by evaluating other sensors such as odometry or analyzing landmarks using surroundings sensors. The digital map in this case is provided by a central unit, a copy of a detail of the digital map capable of being stored in a memory assigned to the vehicle in order to accelerate the retrieval process. In this case, the copy of the digital map is preferably compared with the central unit at regular or irregular time intervals and thereby updated.

The central unit may be a central computing device such as, for example, a server or a cloud server. The digital map in this case is stored in assignment to this central unit. The central unit is preferably wirelessly connected to the vehicle, a wireless Internet connection, for example, may be used for this purpose. For this wireless connection, it is possible, for example, to use mobile communication networks such as, for example, GSM, UMTS or LTE networks, but also other communication technologies such as, for example, W-LAN or Bluetooth. Via the wireless connection, it is possible to convey the entire digital map to the vehicle. In the step of retrieving, however, the central unit preferably does not provide the entire digital map at once, but preferably conveys the reference threshold value or the information regarding an expected ground echo amplitude to the vehicle as a function of the instantaneous vehicle position. It is also possible to convey a detail of the digital map to the vehicle as a function of the instantaneous vehicle position, this digital map containing the predefined threshold values or the information regarding an expected ground echo amplitude.

The threshold value used for comparing the instantaneous amplitude of the received ground echo is either predefined by the retrieved reference threshold value or is determined from information regarding the expected ground echo amplitude. For this purpose, the information regarding an expected ground echo amplitude preferably includes a reference amplitude and a confidence value, the threshold value being determined as a function of this reference amplitude and of the confidence value. A permissible deviation from the reference amplitude is ascertained for this purpose, based on the confidence value, for example, and the threshold value is accordingly determined as the difference between the reference amplitude and the permissible deviation.

The reference threshold value in this case may be conveyed, in particular, as an expected measured value of a ground echo for a reference sensor, which is situated according to a reference installation. The reference threshold value may then be converted via a calculation rule into the threshold value for the specific ultrasonic sensor of the vehicle and for the actual installation location at the vehicle. In this way, changes to the measured amplitude resulting from another installation location or from another sensor type are taken into account. The calculation rule may be stored in a control unit assigned to the vehicle or may be retrieved together with the reference threshold value from the digital map.

In this method, the steps of determining, of retrieving and of comparing are carried out by the vehicle or by a control unit assigned to the vehicle. The central unit in this method provides the digital map.

The example method provided for monitoring the function of ultrasonic sensors in accordance with the present invention is preferably run through repeatedly in order to be able to continuously monitor the function of the corresponding ultrasonic sensor. It may be provided, for example, that the method is run through each time when a ground echo is received by an ultrasonic sensor to be checked. Since the ultrasonic sensors usually emit ultrasonic signals periodically during the operation of the vehicle and accordingly receive reflected ultrasonic echoes back, the method is accordingly preferably periodically repeated.

In addition, it may be provided to carry out the method at a greater time interval relative to predefined points in time and/or at particular, preferred positions or locations.

The vehicle preferably conveys the amplitude of the ground echo measured with the ultrasonic sensor together with the instantaneous vehicle position to the central unit, the central unit updating the information stored in the digital map for this position and/or the stored reference threshold value based on the conveyed amplitude. Derived data such as a confidence value may also be updated. In the process, a high confidence value may be assigned in the event of a minimal scattering of the conveyed amplitudes and a low confidence value may accordingly be assigned in the event of a high scattering.

In this way, the digital map stored in the central unit is continuously adapted to the instantaneous road conditions, so that the information stored in the digital map or the reference threshold value are always up-to-date.

The amplitude of the ground echoes conveyed by the vehicle are preferably standardized. In this way, deviations in the measured amplitude due to different sensor types and/or different installation positions may be compensated for. For this purpose, the ascertained amplitudes are preferably converted into a standard sensor type with a standard installation position. This standardization may, for example, be carried out by a control unit assigned to the vehicle or alternatively also take place via the central unit. If the standardization is to be carried out by the central unit, additional information regarding vehicle type, sensor type and/or installation position is then preferably transmitted.

Information regarding road conditions is preferably determined by the central unit using the conveyed amplitude of the ground echoes, and this information is preferably conveyed to the vehicle and/or to other services.

The road conditions prevailing at a particular location may change due to a change of temperature or due to precipitation. Such a change of the road conditions may be identified by the central unit by focusing on the temporal development of the amplitudes of ground echoes conveyed by vehicles to the central unit at a particular location. In general, high amplitudes of a ground echo indicate rough surfaces and low amplitudes of ground echoes indicate smooth, planar surfaces. If the amplitudes conveyed by the vehicles change for a particular position on the digital map in such a way that the amplitudes decrease, then it may be concluded that the surface condition of the road has changed due to wetness, ice or snow and a hazard due to slick conditions potentially exists. If additional data such as the local current weather or such as the local prevailing temperature are included, then the central unit is also able, for example, to distinguish whether the surfaces of the roads are merely wet or whether the surfaces are covered by ice or snow. A reduction of the conveyed amplitudes of the ground echoes in combination with a temperature below the freezing point indicates a road covered with ice or snow.

The information regarding road conditions thus determined are preferably conveyed to the vehicles connected to the central unit. In addition, the central unit may also convey this information to other service providers such as, for example, weather data providers. This conveyance, like the communication with the vehicle, may take place wirelessly, for example, via a wireless Internet connection.

The digital map preferably contains information regarding locations, which ensures uniform ground echo amplitudes due to open areas and/or for which a variance of the amplitudes of ground echoes conveyed to the central unit falls below a predefined limiting value.

These locations marked in the digital map represent preferred positions, at which a function check of the ultrasonic sensor may take place with particularly high reliability. A function check of an ultrasonic sensor carried out at such a location is therefore preferably marked with a higher confidence level than a function monitoring carried out at another location.

The particular locations in the digital map may already be preselected, for example, locations are suitable which have particularly uniform and constant road surface conditions and large open areas that include few obstacles such as, for example, curbsides. Such suitable areas are, for example, large open parking areas or large intersections. These locations may, however, also be ascertained by the central unit itself in that the variance of the amplitudes conveyed by vehicles is analyzed. A location in which a minimal variance of the conveyed amplitudes exists is better suited for carrying out a function monitoring than a location at which a wide variance exists in the values for the conveyed amplitudes. By providing a limiting value, the central unit is able to ascertain these suitable locations in an automated manner.

One further aspect of the present invention relates to the provision of a central unit that includes communication device for communicating with a vehicle and a computing device. The central unit is designed and/or configured to carry out the method described herein. Accordingly, features described within the scope of the method apply for the central unit and vice versa.

The computing device of the central unit preferably includes a memory device, in which a digital map including reference threshold values and/or information regarding expected ground echo amplitudes as a function of the respective location are stored. The central unit is configured to provide the digital map to vehicles, if necessary, only individual pieces of information being conveyed as a function of a vehicle position or a detail of the map being conveyed to the respective vehicle as a function of the vehicle position.

The central unit is preferably configured to receive information regarding ground echoes from vehicles and to update the reference threshold values stored in the digital map and/or information regarding ground echo amplitudes using this information. The computing device is preferably also configured to standardize received information.

The central unit is preferably also configured to analyze the information regarding ground echoes stored in the digital map received by the vehicles and to determine information regarding road conditions based on a temporal change. To convey this information regarding road conditions, the central unit may also be configured to communicate with other servers or service providers such as, in particular, weather data providers.

The communication device for communicating with a vehicle may be designed, for example, as an Internet connection, the vehicle accordingly then having a wireless Internet connection.

One further aspect of the present invention is the provision of a device that includes a control unit and communication device for communicating with a central unit. The device is configured and/or designed to be used with one of the described methods. Accordingly, features described within the scope of the method apply to the device and, vice versa, features described within the scope of the device are considered to be described for the method.

The device is designed and configured to monitor the function of the at least one ultrasonic sensor in a vehicle that includes at least one ultrasonic sensor.

The device is configured, in particular, to determine an instantaneous amplitude of a ground echo received by an ultrasonic sensor and to determine an instantaneous vehicle position. The device is further configured to retrieve from a digital map a reference threshold value or information regarding an expected ground echo amplitude as a function of the instantaneous vehicle position, the digital map being provided by a central unit. The device is also configured to compare the instantaneous amplitude of the received ground echo with a threshold value, a malfunction of the ultrasonic sensor being deduced if the threshold value is undershot and the threshold value being predefined by the reference threshold value or the threshold value being determined based on the information regarding an expected ground echo amplitude.

According to the present invention, a computer program is also provided, according to which the steps of one of the methods to be carried out by the central unit are carried out when the complete program is executed on a programmable computing device. According to the present invention, a computer program is also provided, according to which the steps of one of the methods to be carried out by the device are carried out when the computer program is executed on a programmable computing device.

The computer program, which executes the steps of the method to be carried out by the device may, for example, be a module for implementing a driving assistance system or a subsystem thereof in a vehicle or in a control unit of a vehicle.

The computer programs provided may be stored on a machine-readable memory medium, for example, on a permanent or re-writable memory medium or in assignment to a computer device or on a removable CD-ROM, DVD, Blu-ray disk or a USB stick. In addition or alternatively, the computer program may be provided for downloading on a computing device such as a server, for example, via a data network such as the Internet or a communication link such as a telephone line or a wireless connection.

The method provided in accordance with the present invention, and the device and the central unit configured to be used with the method permit the function monitoring of an ultrasonic sensor based on the ground echo received by the respective ultrasonic sensor. A reference threshold value or information regarding an expected ground echo amplitude is here advantageously provided, so that the function of the corresponding ultrasonic sensor may be ascertained by a simple comparison. A malfunction of the sensor is deduced if the ground echo amplitude conveyed by the ultrasonic sensor falls below the reference threshold value or below a threshold value derived from the information regarding the expected ground echo amplitude. Such a malfunction may be caused, in particular, by a complete or partial coverage of the sensor with dirt, snow or ice, which blocks the sensor.

In contrast to conventional methods, no comparison value ascertained as a reference by an additional sensor is required. This makes it possible on the one hand to be able to check the function of each ultrasonic sensor independently of other sensors. In addition, a malfunction of an ultrasonic sensor may then also be identified if all sensors of the vehicle are equally impaired. Thus, it is possible that not just one individual ultrasonic sensor, but all ultrasonic sensors of a vehicle are covered with snow and thus a comparison of the sensor values with each other is unable to reveal the malfunction.

It is particularly advantageous in this method that by using a central unit, it is possible to convey instantaneous information regarding the ground echoes expected at the instantaneous vehicle position or corresponding reference threshold values. In advantageous embodiment variants, the instantaneously measured ground echo amplitudes are also conveyed by the vehicle communicating with the central unit, so that the central unit is able to continuously update a corresponding digital map.

In addition, it is advantageously possible to analyze a temporal change of the amplitudes ascertained for a particular location to the central unit and to deduce therefrom the changing road conditions. It makes it advantageously possible to emit corresponding warnings of difficult road conditions such as, for example, slickness, to vehicles connected to the central unit. Since wetness also represents a crucial parameter for the friction coefficient of a road, the collected pieces of information may also be used for the creation and distribution of a digital map that includes friction coefficients of the roads.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

Figure 1:
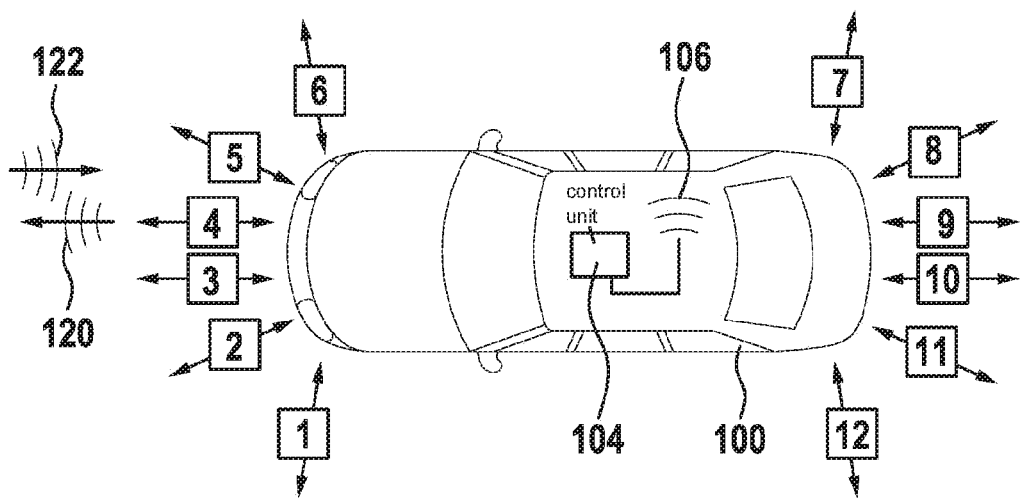
FIG. 1 schematically shows a representation of a vehicle including a device according to the present invention for monitoring ultrasonic sensors as well as a schematic representation of a central unit.
Figure 1:
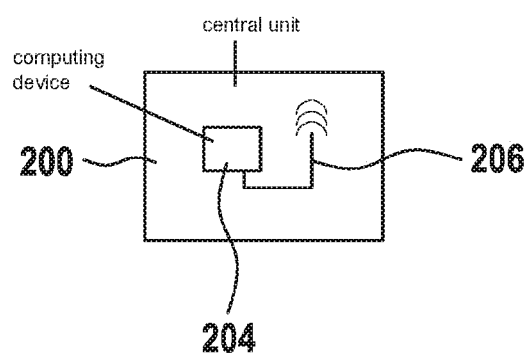

In the following description of the exemplary embodiments of the present invention, identical or similar components or elements are identified with the same reference numeral, a repeated description of the components or elements being omitted in individual cases. The figures represent only schematically the subject matter of the present invention.

In FIG. 1, a vehicle 100 is schematically depicted, which has a total of twelve ultrasonic sensors 1 through 12. Six ultrasonic sensors 1 through 6 are situated in the front end of vehicle 100 and six ultrasonic sensors 7 through 12 are situated in the rear end of vehicle 100. A control unit 104, which is connected to ultrasonic sensors 1 through 12, is provided for monitoring the function of ultrasonic sensors 1 through 12. Ultrasonic sensors 1 through 12 operate according to the pulse-echo principle, by which ultrasonic signals 120 are emitted by ultrasonic sensors 1 through 12 and ultrasonic echoes 122 are reflected by objects in the surroundings of vehicle 100 and are received back by ultrasonic sensors 1 through 12. The ground such as, for example, the road on which vehicle 100 is located, also reflects at least a part of emitted ultrasonic signals 120. These ground echoes are received by ultrasonic sensors 1 through 12. Within the scope of the normal operation of ultrasonic sensors 1 through 12 for identifying objects in the surroundings of vehicle 100, the ultrasonic sensors regularly emit ultrasonic signals 120 and regularly receive ultrasonic echoes 122 accordingly. To monitor the function of ultrasonic sensors 1 through 12, the amplitudes of the received ground echoes are determined in a first step for each of the individual sensors. In addition, the instantaneous vehicle position is ascertained by control unit 104.

In a next step, a reference threshold value or information regarding an expected ground echo amplitude is retrieved from a digital map as a function of the instantaneous vehicle position. This information includes, for example, a reference amplitude 300, cf. FIGS. 2 and 3, and a confidence value, depending on the embodiment variant of the method.

The digital map is provided by a central unit 200. Central unit 200 includes a computing device 204 and a communication device 206 for communicating with vehicle 100. Vehicle 100 accordingly also includes communication device 106 for communicating with central unit 200.

To retrieve a reference threshold value or the information regarding an expected ground echo amplitude, vehicle 100 may, for example, convey the instantaneous vehicle position to central unit 200, which then conveys the reference threshold value applicable for the instantaneous vehicle position or information regarding expected ground echoes applicable for the instantaneous vehicle position to vehicle 100. Alternatively, a copy of at least one detail of the digital map in control unit 104 may be stored in a memory assigned to vehicle 100. Vehicle 100 may then compare from time to time or also at regular time intervals the local copy with the digital map stored in central unit 200. For this purpose, vehicle 100 may, for example, convey its instantaneous vehicle position to central unit 200, which then conveys a map detail around the vehicle position to vehicle 100.

Figure 2:
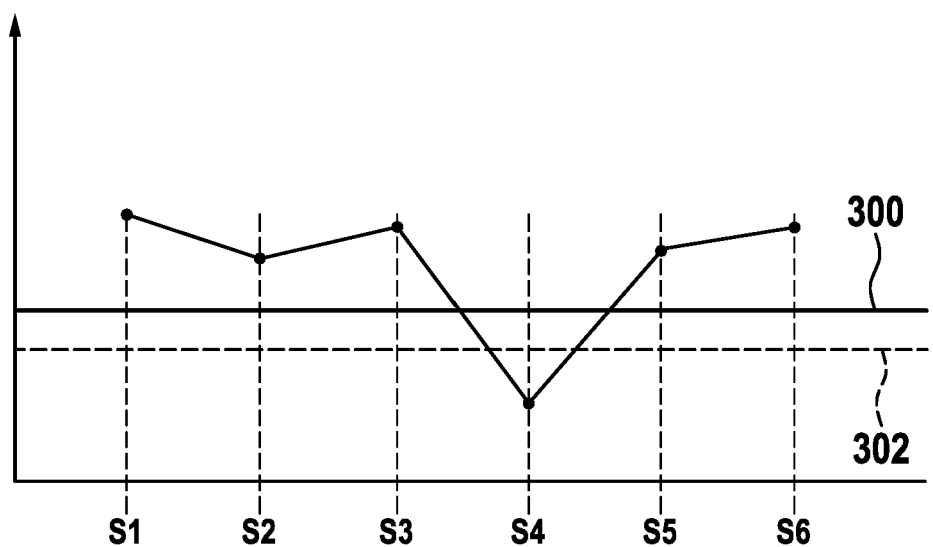
FIG. 2 shows a graphic representation of the ground echo amplitudes of the ultrasonic sensors situated in the front end of the vehicle for a first situation.
Figure 3:
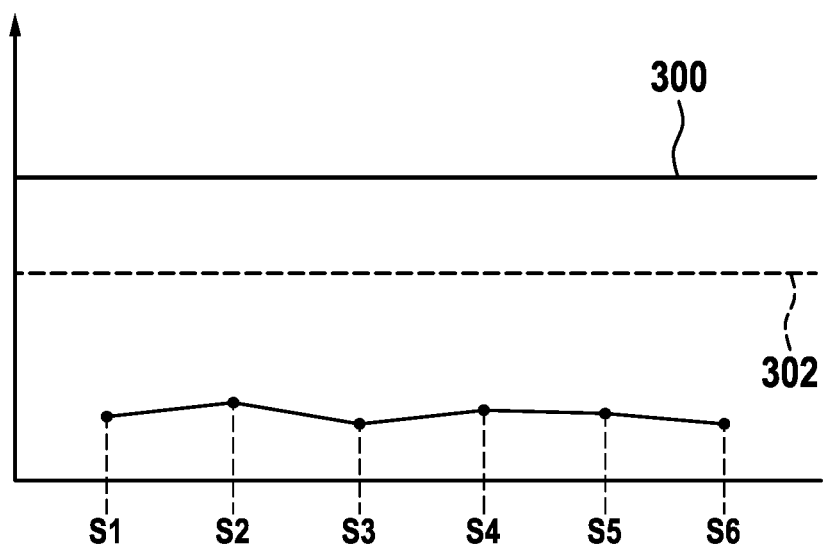
FIG. 3 shows a graphic representation of the ground echo amplitudes of the ultrasonic sensors situated in the vehicle front end for a second situation.

If a reference threshold value is retrieved from the digital map, this may then be directly used as threshold value 302, cf. FIGS. 2 and 3, for a comparison with the ascertained ground echo amplitudes. If necessary, the reference threshold value is converted for this purpose according to a conversion rule for specific ultrasonic sensor 1 through 12 of vehicle 100 and for the installation location of ultrasonic sensors 1 through 12. If, on the other hand, information regarding the expected ground echoes is retrieved, then threshold value 302 is calculated from this information by control unit 104. This may take place in that a difference is formed between a reference amplitude 300, cf. FIGS. 2 and 3, and a tolerance as a function of a confidence value. Alternatively, a previously established tolerance may, for example, also be subtracted from reference amplitude 300.

If during a comparison between a ground echo amplitude ascertained by one of ultrasonic sensors 1 through 12 and threshold value 302 it is established that threshold value 302 is undershot, an error of corresponding ultrasonic sensor 1 through 12 is then deduced.

This assessment of an ultrasonic sensor 1 through 12 may be provided with a confidence level, the digital map capable of containing information regarding locations which, due to particularly reproducible ground echo amplitudes, are particularly suitable for a function check of ultrasonic sensors 1 through 12. If it is established at such a location that threshold value 302 is undershot, this diagnosis may be provided with a high confidence level, whereas an undershooting of the threshold value established at another location may be provided with a lower confidence level.

FIG. 2 represents the ground echo amplitudes ascertained by respective ultrasonic sensors 1 through 6 for a first situation, in which one single ultrasonic sensor 1 through 6 exhibits a malfunction. Ultrasonic sensors 1 through 6 are, for example, the six ultrasonic sensors 1 through 6 installed in the vehicle front end. FIG. 2 shows a diagram, in which the amplitudes for the six ultrasonic sensors 1 through 6 situated in the front end of vehicle 100 have been plotted on the y-axis. In this case, the dot identified with S1 represents the amplitude of first ultrasonic sensor 1, the dot identified with S2 represents the amplitude of second ultrasonic sensor 2, the dot identified with S3 represents the amplitude of third ultrasonic sensor 3, the dot identified with S4 represents the amplitude of fourth ultrasonic sensor 4, the dot identified with S5 represents the amplitude of fifth ultrasonic sensor 5 and the dot identified with S6 represents the amplitude of sixth ultrasonic sensor 6. In addition, a reference amplitude 300 and a threshold value 302 derived on the basis of reference amplitude 300 and of a confidence value also ascertained are entered in the diagram.

As may be gathered from the diagram of FIG. 2, the ground echo amplitude of fourth ultrasonic sensor 4 is below threshold value 302, whereas the ground echo amplitudes of ultrasonic sensors 1 through 3 as well as 5 and 6 are above threshold value 302. Accordingly, a malfunction of ultrasonic sensor 4 is deduced.

FIG. 3 shows a diagram including ground echo amplitudes of six ultrasonic sensors 1 through 6 plotted therein, which are installed, for example, on the vehicle front end of vehicle 100. As previously described with reference to FIG. 2, reference amplitude 300 as well as threshold value 302 are also entered in the diagram.

In the situation depicted in FIG. 3, the ground echo amplitudes of all ultrasonic sensors 1 through 6 are below threshold value 302. Thus, it is concluded that all six ultrasonic sensors 1 through 6 involved exhibit a malfunction. Such a situation may occur if, for example, all ultrasonic sensors 1 through 12 or all ultrasonic sensors 1 through 6 situated in the front and ultrasonic sensors 7 through 12 situated in the rear are equally affected by an interference, for example, all are equally covered by snow or dirt.

No comparison of ground echo amplitudes of various ultrasonic sensors 1 through 12 among one another is advantageously required when using the method provided, so that a malfunction may also be identified when the malfunction affects all ultrasonic sensors 1 through 12 equally and, accordingly, the ground echo amplitudes of all ultrasonic sensors 1 through 12 drop in equal measure. With the amplitude reference provided by the digital map, it is possible in the process to reliably distinguish between a malfunction of all ultrasonic sensors 1 through 12 and a change of the road conditions, which also results in a uniform change of the ground echo amplitudes.

The present invention is not limited to the exemplary embodiments described herein and the aspects highlighted therein. Instead, a multitude of modifications are possible within the scope of the present invention.

What is claimed is:

1. A method for monitoring the function of an ultrasonic sensor system having ultrasonic sensors of a vehicle, the ultrasonic sensors of the vehicle emitting ultrasonic signals and receiving reflected ultrasonic echoes back, the method comprising:
    a) determining an instantaneous amplitude of a ground echo received by the ultrasonic sensor and determining an instantaneous vehicle position;
    b) retrieving as a function of the instantaneous vehicle position, from a digital map, (i) a reference threshold value or (ii) information regarding an expected ground echo amplitude, wherein the digital map is provided by a central unit; and
    c) comparing the instantaneous amplitude of the received ground echo with a threshold value, a malfunction of the ultrasonic sensor being determined when the threshold value is undershot;
    wherein the threshold value is predefined by the reference threshold value or the threshold value is determined based on the information regarding the expected ground echo amplitude,
    wherein the information regarding an expected ground echo amplitude includes a reference amplitude and a confidence level or value, the threshold value being determined as a function of the reference amplitude and of the confidence level or value, and
    wherein the assessment of each of the ultrasonic sensors are provided with the confidence level, the digital map containing information regarding locations which, due to reproducible ground echo amplitudes, are suitable for a function check of each of the ultrasonic sensors, wherein if it is established at such a location that the threshold value is undershot, the diagnosis is provided with a high confidence level, and wherein an undershooting of the threshold value established at another location is provided with a lower confidence level.

2. The method as recited in claim 1, wherein the vehicle is wirelessly connected to the central unit, the central unit conveying the reference threshold value or the information regarding an expected ground echo amplitude to the vehicle as a function of the instantaneous vehicle position.

3. The method as recited in claim 1, wherein the vehicle conveys the instantaneous amplitude of the ground echo determined with the ultrasonic sensor together with the instantaneous vehicle position to the central unit, the central unit updating, based on the conveyed instantaneous amplitude: (i) the information for this position stored in the digital map, and/or (ii) the reference threshold value.

4. The method as recited in claim 3, wherein the instantaneous amplitude of the ground echo conveyed by the vehicle is standardized.

5. The method as recited in claim 3, wherein the central unit determines information regarding road conditions using the conveyed instantaneous amplitude of the ground echo and conveys the information to the vehicle and/or to other services.

6. The method as recited in claim 1, wherein the digital map contains information regarding particular locations having uniform ground echo amplitudes due to open areas, and/or the particular locations having a variance of amplitudes conveyed to the central unit by vehicles that falls below a predefined limiting value.

7. A central unit, comprising:
    a communication device for communicating with a vehicle; and
    a computing device;
    wherein the central unit is configured to perform the following:
    a) receiving, from the vehicle, a determined an instantaneous amplitude of a ground echo received by an ultrasonic sensor of the vehicle and a determined instantaneous vehicle position of the vehicle;
    b) retrieving as a function of the received instantaneous vehicle position, from a digital map, (i) a reference threshold value or (ii) information regarding an expected ground echo amplitude; and c) conveying, to the vehicle, (i) the reference threshold value or (ii) the information regarding an expected ground echo amplitude, wherein the information regarding an expected ground echo amplitude includes a reference amplitude and a confidence level or value, the threshold value being determined as a function of the reference amplitude and of the confidence level or value, and wherein the assessment of each of the ultrasonic sensors are provided with the confidence level, the digital map containing information regarding locations which, due to reproducible ground echo amplitudes, are suitable for a function check of each of the ultrasonic sensors, wherein if it is established at such a location that the threshold value is undershot, the diagnosis is provided with a high confidence level, and wherein an undershooting of the threshold value established at another location is provided with a lower confidence level.

8. A device for monitoring the function of an ultrasonic sensor system having ultrasonic sensors of a vehicle, comprising:
   a control unit; and
   a communication device configured for communicating with a central unit;
   wherein the control unit is configured to perform the following:
      a) determining an instantaneous amplitude of a ground echo received by the ultrasonic sensors and determining an instantaneous vehicle position;
      b) retrieving as a function of the instantaneous vehicle position, from a digital map, (i) a reference threshold value or (ii) information regarding an expected ground echo amplitude, wherein the digital map is provided by a central unit; and
      c) comparing the instantaneous amplitude of the received ground echo with a threshold value, a malfunction of the ultrasonic sensor being determined when the threshold value is undershot;
   wherein the threshold value is predefined by the reference threshold value or the threshold value is determined based on the information regarding the expected ground echo amplitude,
   wherein the information regarding an expected ground echo amplitude includes a reference amplitude and a confidence level or value, the threshold value being determined as a function of the reference amplitude and of the confidence level or value, and
   wherein the assessment of each of the ultrasonic sensors are provided with the confidence level, the digital map containing information regarding locations which, due to reproducible ground echo amplitudes, are suitable for a function check of each of the ultrasonic sensors, wherein if it is established at such a location that the threshold value is undershot, the diagnosis is provided with a high confidence level, and wherein an undershooting of the threshold value established at another location is provided with a lower confidence level.

9. A non-transitory computer readable memory medium on which is stored a computer program, which is executable by a processor, comprising:
   a program code arrangement having program code for monitoring the function of an ultrasonic sensor system having ultrasonic sensors of a vehicle, the ultrasonic sensor of the vehicle emitting ultrasonic signals and receiving reflected ultrasonic echoes back, by performing the following:
      a) determining an instantaneous amplitude of a ground echo received by the ultrasonic sensors and determining an instantaneous vehicle position;
      b) retrieving as a function of the instantaneous vehicle position, from a digital map, (i) a reference threshold value or (ii) information regarding an expected ground echo amplitude, wherein the digital map is provided by a central unit; and
      c) comparing the instantaneous amplitude of the received ground echo with a threshold value, a malfunction of the ultrasonic sensor being determined when the threshold value is undershot;
   wherein the threshold value is predefined by the reference threshold value or the threshold value is determined based on the information regarding the expected ground echo amplitude,
   wherein the information regarding an expected ground echo amplitude includes a reference amplitude and a confidence level or value, the threshold value being determined as a function of the reference amplitude and of the confidence level or value, and
   wherein the assessment of each of the ultrasonic sensors are provided with the confidence level, the digital map containing information regarding locations which, due to reproducible ground echo amplitudes, are suitable for a function check of each of the ultrasonic sensors, wherein if it is established at such a location that the threshold value is undershot, the diagnosis is provided with a high confidence level, and wherein an undershooting of the threshold value established at another location is provided with a lower confidence level.

* * * * *